United States Patent [19]

Nelson

[11] 3,970,980

[45] July 20, 1976

[54] ROTARY ACTUATOR HAVING STATIONARY ARMATURE AND ROTARY FIELD

[76] Inventor: Victor Nelson, 10 Redwood Drive, Dix Hills, N.Y. 11746

[22] Filed: May 15, 1975

[21] Appl. No.: 577,720

[52] U.S. Cl.............................. 335/253; 335/229; 335/272; 310/39; 310/67 R
[51] Int. Cl.²............................................ H01F 7/08
[58] Field of Search .......... 335/253, 272, 229, 230; 310/67, 36–39, 156, 269

[56] References Cited

UNITED STATES PATENTS

| | | | |
|---|---|---|---|
| 3,142,789 | 7/1964 | Rhodes............................ | 310/39 X |
| 3,388,273 | 6/1968 | Davis................................ | 310/67 |
| 3,466,482 | 9/1969 | Peters.............................. | 310/269 |
| 3,479,626 | 11/1969 | Silverman et al.............. | 335/272 X |
| 3,671,899 | 6/1972 | Clift................................. | 335/253 |
| 3,761,851 | 9/1973 | Nelson............................ | 335/253 |
| 3,889,219 | 6/1975 | Larner............................ | 335/253 X |

Primary Examiner—Donovan F. Duggan
Attorney, Agent, or Firm—Edward H. Loveman

[57] ABSTRACT

A rotary actuator provides rotation of its rotor over predetermined angles. The rotor is a cylindrical housing in which are cylindrically curved permanently magnetized poles spaced apart at their ends and surrounding a fixed armature. The armature has magnetic arms angularly disposed with respect to each other which define fixed poles. Coils wound on the fixed poles generate magnetic fields when energized to drive the rotor. A holding coil may be provided to hold the rotor stationary when the holding coil is energized. The armature may have two, three or more fixed poles. The actuator can be operated in rotor latching or fail-safe return modes. Fixed stop members may be used to limit angular rotation of the rotor.

11 Claims, 36 Drawing Figures

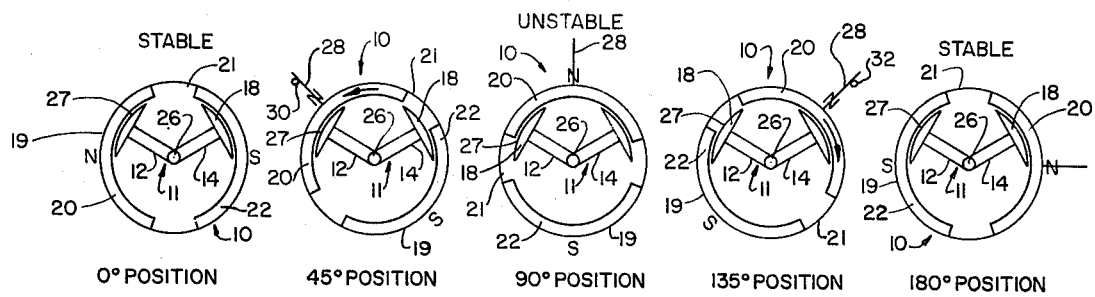
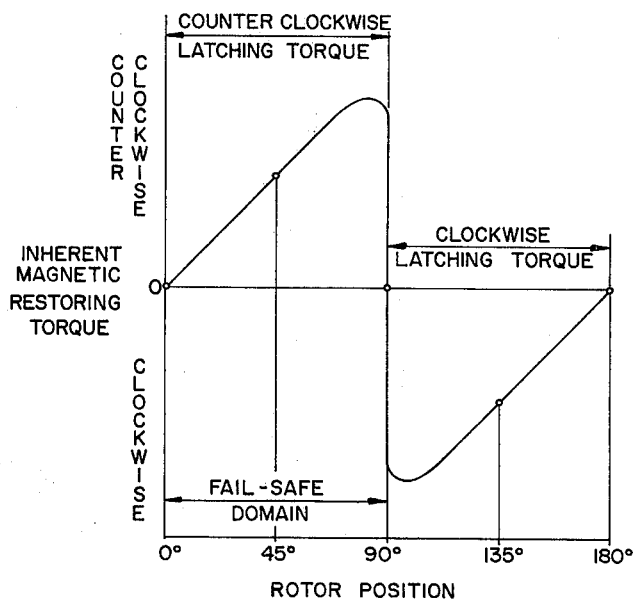
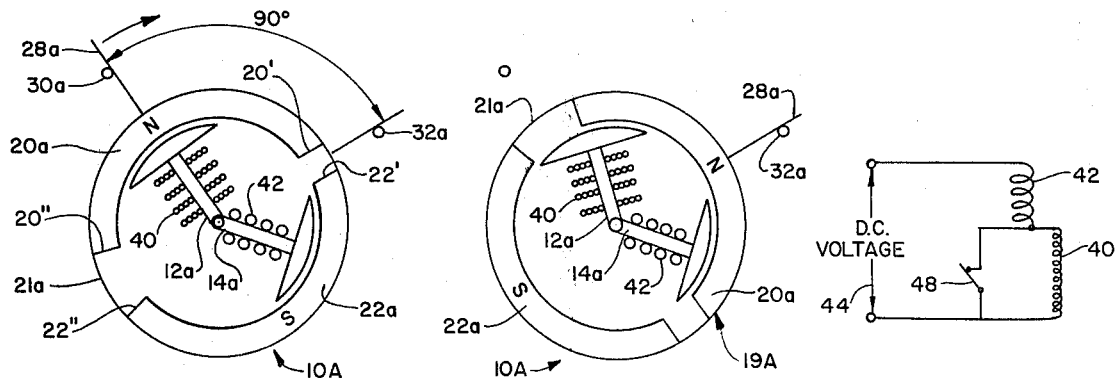

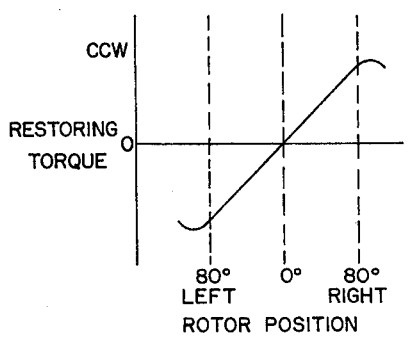
FIG. 17
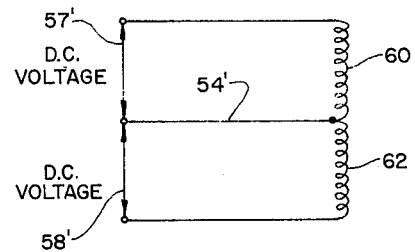
FIG. 16
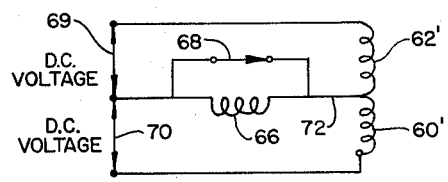
FIG. 21
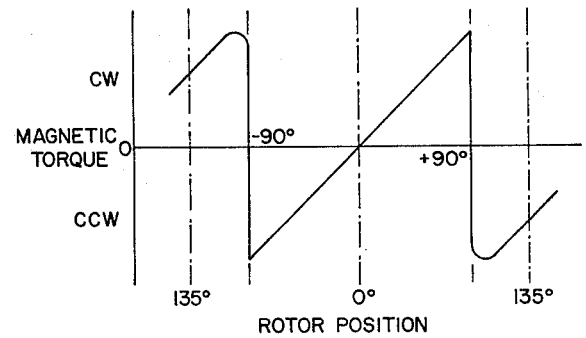
FIG. 25
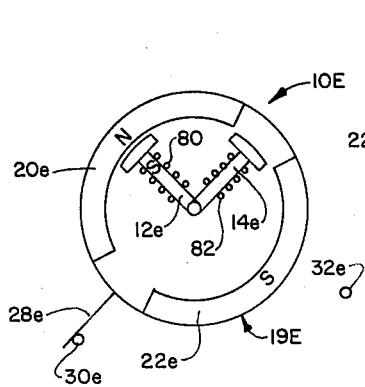
FIG. 23
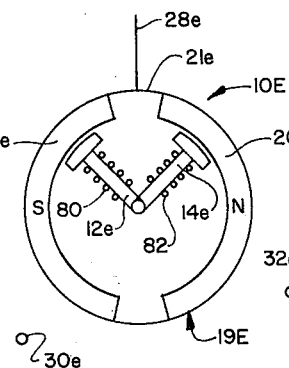
FIG. 22
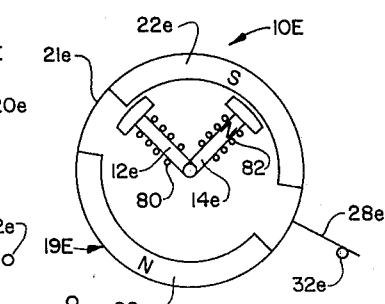
FIG. 24
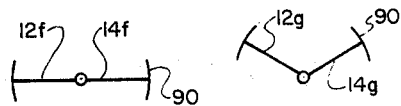
FIG. 26A
FIG. 26B
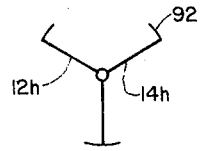
FIG. 26C
FIG. 26D
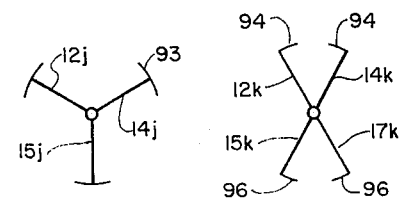
FIG. 26E

ROTARY ACTUATOR HAVING STATIONARY ARMATURE AND ROTARY FIELD

This invention relates to the art of sector motors and more particularly to a direct motion rotary actuator having a stationary armature with field poles surrounded by a rotor having a plurality of permanently magnetized poles.

The invention involves improvements over those described in my prior U.S. Pat. No. 3,761,851, which issued on Sept. 25, 1973. In my prior actuator an armature was rotated and a plurality of poles surrounding the armature were fixed. The armature disclosed in the patent had two poles with commutation means including wipers or brushes which were required to energize the coils wound on the poles of the rotary armature.

In the present invention the armature is stationary and has two, three or more radial arms defining fixed poles on which are wound drive coils. A holding coil may also be provided to hold the rotor stationary. The rotor may have two cylindrically curved permanently magnetized field poles surround the armature, with the field poles of opposite magnetic polarity and mounted in a cylindrical housing made of steel and provided with a power takeoff shaft to drive a mechanical load. Stop members may be provided which are spaced angularly apart and serve to engage a stop arm carried by the rotor to limit angular rotation thereof.

By appropriately disposing the fixed poles angularly and selectively spacing the field poles circumferentially of the housing, it is possible to operate the actuator in rotor latched and automatic fail-safe return modes.

A number of advantages or objects are derived by providing a fixed armature and rotary field poles as compared with the prior rotary actuators:

1. The commutators, brushes, wipers and associated switches may be eliminated.
2. The armature may be hard-wired directly to its voltage source to increase reliability of operation, avoid contact and brush problems, and avoid commutation difficulties.
3. Since the armature is stationary, it may be provided with a suitably heat-sink and thus it may be subjected to additional electrical power, for exerting a greater and more positive torque. The increased heat can be dissipated to the fixed frame support for the armature.
4. The actuator may be operated safely in an explosive atmosphere, since the sparking and the arcs generated by brushes and commutators are eliminated.
5. The rotary housing may be a massive structure providing a flywheel effect to enhance the torque capabilities of the actuator.
6. The overall construction of the rotary actuator is simpler, and thus more reliable in operation.

These and other objects and many of the attendant advantages of this invention will be readily appreciated as the same becomes better understood by reference to the following detailed description when considered in connection with the accompanying drawings in which:

FIGS. 1 through 5 are diagrammatic views of a fixed armature and rotatable field poles, with the field poles shown in five significant positions;

FIGS. 6, 17 and 25 are torque diagrams used in explaining the various modes of operation of the invention;

FIGS. 7A and 7B are views of an armature with two poles carrying exciting windings, with rotatable field poles shown in two extreme positions useful for the fail-safe mode of operation;

FIGS. 8, 12, 16 and 21 are diagrams of energizing circuits for the armatures of FIGS. 7A, 9, 13 and 18 respectively;

FIGS. 22, 23 and 24 are views of an armature with two poles carrying exciting windings, with rotatable field poles in three positions useful for the latching mode of operation;

FIGS. 26A through 26E are diagrams of five different armature configurations;

Figure 9:
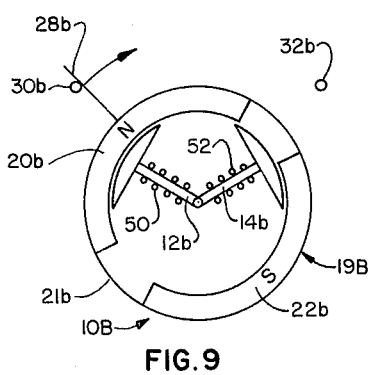
FIGS. 9, 10, 11 are views of an armature with two poles carrying exciting windings, with rotatable field poles shown in three significant positions, useful for the latching mode of operation.

Referring now to the drawings wherein like reference characters designate like or corresponding parts throughout, there is illustrated in FIG. 1 a rotary actuator assembly generally designated as reference numeral 10 with a stationary armature generally designated as reference numeral 11 having a pair of radial arms defining magnetic poles 12, 14 set 120° apart and each carrying a shoe 18 extending circumferentially of its respective pole and both poles conferred between opposite ends of the shoes 18. The armature 11 is surrounded by a rotor generally designated by reference numeral 19 including a cylindrical housing 21 carrying a pair of cylindrically curved field poles 20, which are respectively permanently magnetized N (north) and S (south). The housing 21 may have an axial power takeoff shaft (not shown). The housing 21 and the field poles 20, 23 are rotatable on an axis coaxial with an axis 26 of the stationary armature 11. The armature shoes 18 have curved faces 27 disposed adjacent the field poles 20, 22. The housing 21 and the field poles 20, 22 are stable in the 0° position since the field poles 20, 22 are symmetrically disposed with respect to the armature poles 12, 14 and their is a minimum reluctance path between the field poles and the armature poles. FIG. 6 shows the condition of stability at the 0° position with zero restoring torque.

FIG. 2 shows the field poles 20, 22 rotated 45° clockwise from the 0° position of FIG. 1. This is an unstable position, but the poles 20, 22 are held in this latched position by a radial arm 28 bearing against a fixed stop member 30. The arm 28 is secured to the housing 21 and rotates with it.

There is a restoring torque in the counterclockwise direction as shown in FIG. 6 at this position of the field poles 20, 22.

FIG. 3 shows the field poles 20, 22 rotated 90° clockwise from the 0° position of FIG. 1. This is an unstable (or conditionally stable) position, which will be subject to a maximum restoring torque in clockwise or counterclockwise directions by a slight departure from the 90° position as shown in FIG. 6.

FIG. 4 shows the field poles 20, 22 rotated 135° clockwise from the 0° position of FIG. 1. This is an unstable position. There is a torque in the clockwise direction as shown in FIG. 6 at the 135° position. The field poles 20, 22 are held latched in this position by a fixed stop member 32 which is contacted by the arm ans subject to the clockwise torque.

FIG. 5 shows the field poles 20, 22 roated 180° clockwise from the position of FIG. 1. This is a stable position since the movable poles 20, 22 are aligned in a position of minimum reluctance as in FIG. 1. FIG. 6 shows that there is zero restoring torque at the 180° position of the field poles 20, 22.

It will be apparent from the inspection of FIGS. 1–5, that if windings are provided on the poles 12, 14 of the armature 11 and current is passed through the windings, that interactions will take place between the fields of the permanent magnet field poles 20, 22 and the magnetic flux produced by the current in the windings. Depending on the direction and magnitude of the currents, the armature poles 12, 14 will attract or repel the field poles 20, 22. If the field poles 20, 22 are in the position shown in FIGS. 1 and 5, substantially no rotational torque will be produced by the armature currents. If the armature is in the position shown in FIG. 3, a rotational torque will be produced and in a direction depending on the direction of current flow. If the current flows in such a direction as to make either one of the armature poles 12 or 14 a north pole, the rotor 19 will rotate clockwise or counterclockwise depending on whether the pole 12 or 14 is energized. Since the energized pole 12 or 14 will repel the adjacent rotor north pole 20 and will be attracted by the rotor south pole 22, a dual force, attraction and repulsion, will be exerted on the field poles resulting in a strong rotational force or torque. Energizing the poles 12 alone thus drives the field poles 20, 22 clockwise, and energizing the pole 14 alone drives the field poles 20, 22 counterclockwise. The field poles 20, 22 will then turn to stable positions shown in FIGS. 1 and 5, or will turn to the latching positions of FIGS. 2 and 4 if the stop members 30, 32 are provided.

FIGS. 7A and 7B shown an actuator assembly 10A with armature windings 40, 42 on respective stationary armature poles 12a, 14a set 120° apart. Hard or fixed stop members 30a, 32a are provided spaced angularly approximately 90° apart. An arm 28a extends radially to the contact stop member 30a in the left position of FIG. 7A and to the contact stop member 32a in the right position of FIG. 7B. The rotatable field poles 20a, 22a are mounted circumferentially asymmetrically with adjacent ends 20', 22' closer together than the ends 20'', 22'' to increase the flux density where the armature pole 14a is positioned. The actuator assembly 10A is arranged for fail-safe operation between the starting position of FIG. 7A and the 90 position of FIG. 7B. A coil 42 is used for driving the rotor 19A and a winding 40 is a high resistance hold coil to limit current after the stroke is completed at the 90° position.

FIG. 8 shows the circuit arrangement for the assembly 10A. Here the drive coil 42 is connected in series with the holding coil 40 and a voltage source 44. A switch 48 is connected across the coil 40 for shunting it so only the winding 42 is effective to turn the rotor.

In operation of actuator assembly 10A, the rotor 19a is initially held at its starting position shown in FIG. 7A. No current is applied. This corresponds to the 10° position shown in FIG. 6. When the DC voltage is applied to the coil 42, a current flow results which generate a magnetic field at the pole 14a which becomes a south pole and repels the permanent magnet south pole 22a and attracts the permanent magnet north pole 20a, which causes the rotor 19A to rotate to the 90° position determined by the stop member 32a. Then the holding coil 40 is energized by opening a switch 48 whereby the pole 12a acts as an electromagnetic probe which together with pole 14a holds the arm 28a against the stop member 32a. Upon removal of the DC voltage the energizing current falls to zero, the coils 40 and 42 become deenergized, and the rotor 19A returns automatically to the starting position of FIG. 7A where the arm 28a contacts the stop member 30a. This arrangement insures fail-safe operation, since the rotor 19A always returns to the starting position in the event of a power failure cutting off the driving and holding current. The coils 40 and 42 are shown wound on separate armature poles. They can if desired be wound on the same pole, either the pole 12a or the pole 14a. Alternatively, both coils may be wound on different armature poles. The operating angle may be set or changed by changing the angular spacing of the fixed stop members 30a, 32a. This operating angle should in general be not more than 90°, since as indicated in FIG. 6 this is the fail-safe operating domain where an inherent restoring torque exists.

Figure 10:
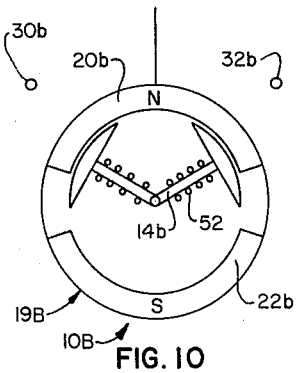
Figure 11:
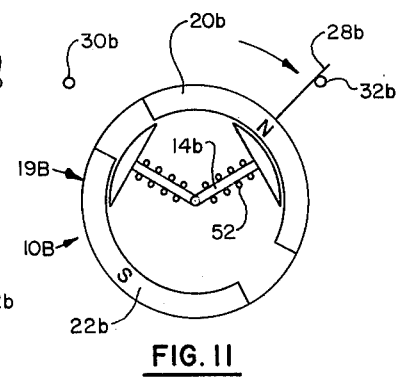

If the rotor stroke is such that it operates on both sides of the 90° position, as shown in FIG. 3, the actuator assembly is a two-position type latched to either extreme position (0° or 180°) when the driving current is removed; see FIGS. 1 and 5. FIGS. 9–11 shows an actuator assembly 10B with a pair of drive coils 50 and 52 wound on respective armature pole 12b and 14b. A pair of field poles 20b and 22b of the rotor generally designated as reference numeral 19B are symmetrically disposed. A pair of stop members 30b and 32b limit the rotational motion of the rotor 19B.

Figure 12:
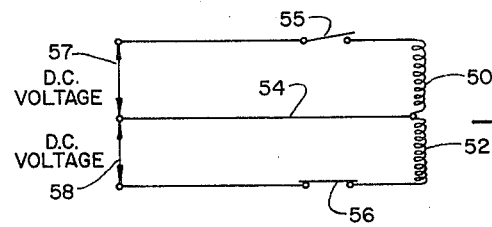

FIG. 12 shows the drive circuit of the actuator assembly 10B. Here a pair of drive coils 50 and 52 are connected to a common line 54. A pair of switches 55 and 56 are respectively connected in series with the coils 50 and 52 between a pair of DC voltage sources 57, 58. The switches 55 and 56 are alternately closed. The switch 56 is closed in the starting position of the rotor 19B as shown in FIG. 9, while the switch 55 is open. The switch 55 is closed when the switch 56 is open to reverse the direction of motion of the rotor 19B. When a voltage is applied to the drive coil 52 a south pole is created at the pole 14b forcing the rotor 19B to rotate beyond the center (conditionally stable) point of FIG. 10 to the latched position of FIG. 11. An arm 28b bears against the stop member 32b. The switch 56 may be opened when the motor 19B is in the latched position of FIG. 11. If the switch 55 is closed when the switch 56 is open, the armature pole 12b will become a south pole, causing the rotor 19B to turn counterclockwise from the position of FIG. 11 to the position of FIG. 9. The stop member 30b and 32b limit rotation to the desired angle. In either extreme position of FIG. 9 or FIG. 11 with current removed from the coils 50, 52 the rotor 19B is latched against the hard stop member 30b or 32b because the rotor 19B seeks a position of minimum magnetic reluctance. The magnetic torque retains the arm 28b of the rotor against the fixed stop member.

Figure 13:
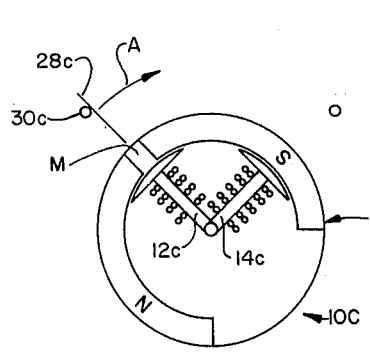
FIGS. 13, 14, 15 are views of an armature with two poles carrying exciting windings, with rotatable field poles in three significant positions useful for the fail-safe mode of operation.
Figure 14:
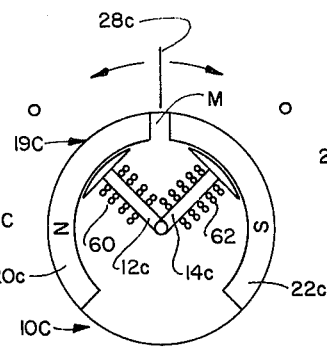
Figure 15:
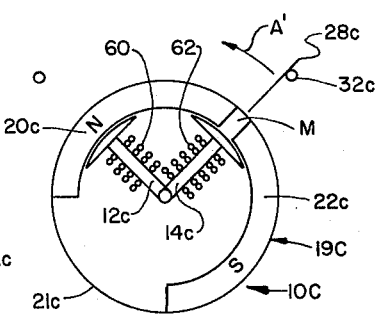

FIGS. 13, 14 and 15, show an actuator assembly 10C arranged for maximum flux density at point M by circumferentially asymmetrically disposing a pair of curved magnetic poles 20c and 22c on a rotor housing 21c. A pair of fixed armature poles 12c and 14c are 90° apart and are wound with an energizing coil 60, 62 respectively arranged to create a respective north and south pole at the poles 12c and 14c when the coils 60, 62 are respectively energized. With neither of the coils 60, 62 energized, the rotor 19C is latched to the midposition shown in FIG. 14. Point M which has minimum reluctance is then symmetrically disposed between the armature poles 12C and 14C. If a DC voltage is applied to the coil 62 on the pole 16c, a current flows in the coil 62 and creates a south pole which will result in rotating the rotor 19c clockwise to the position of FIG. 15. If the current in the coil 62 is maintained, the rotor 19C remains latched in the right position of FIG. 15. A rotor arm 28c then bears against a stop member 32c. Upon removal of power, the rotor 19C returns automatically, due to magnetic torque, to the midposition of FIG. 14. Similarly, if a DC voltage is applied to the coil 60 on the armature pole 12c, the rotor 19C turns counterclockwise to the left position of FIG. 13, as the pole 12c becomes a north pole. The rotor arm 28c then bears against a stop member 30c. Upon removal of power, the rotor 19C returns automatically to the midposition of FIG. 14. Arrows A and A' indicate the direction of inherent magnetic restoring torque.

FIG. 16 shows the basic circuit for the actuator assembly 10C. The coils 60 and 62 are connected to a common line 54'. A pair of DC voltage sources 57' and 58' are provided for energizing the individual coils.

FIG. 17 shows the inherent restoring torque for the actuator assembly 10C. At the 0° position of FIG. 14 the restoring torque is zero. At increasing angles of displacement of up to about 80° right and left, the restoring torque increases in respective counterclockwise (CCW) and clockwise (CW) directions.

Figure 18:
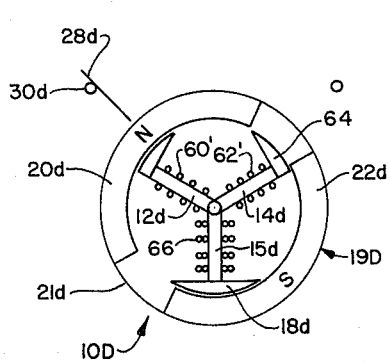
FIGS. 18, 19 and 20 are views of an armature with three poles carrying exciting windings, with rotatable field poles in three significant positions useful for the fail-safe mode of operation.
Figure 19:
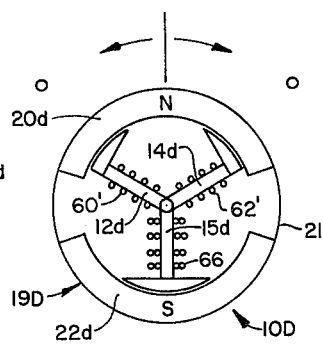
Figure 20:
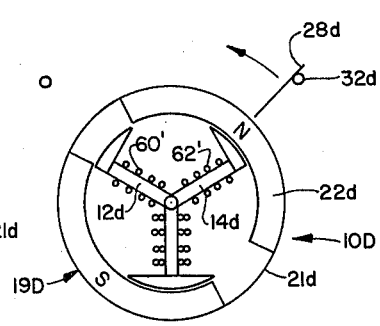

The armature may have a configuration other than two poles. For example, three armature poles may be arranged to provide three operational positions fail-safe to midposition as shown in FIGS. 18, 19 and 20. Here an actuator 10B has three poles 12d, 14d, and 15d. The poles 12d and 14d are spaced 120° apart and the pole 15d is spaced 120° from each of the poles 12d and 14d. The pole 15d carries a full size shoe 18d whereas the poles 12d and 14d have half-size shoes 64 directed toward each other. The poles carry respective coils 60', 62' and 66. The coils 60' and 62' provide a turning torque and the coil 66 serves as a hold coil.

FIG. 21 shows the basic circuit for the actuator 10D. The coil 60' is energized by a voltage source 70 and the coil 62' is energized by a voltage source 69. The coils 60' and 62' are connected in a series with the holding coil 66 which is shunted by a switch 68. FIG. 18 or 20 illustrates the position where the coil 66 may be energized by opening the switch 68 to create a south pole at an armature pole 15d to maintain the rotor 19B in the position shown.

FIG. 18 shows the rotor 19D rotated left counterclockwise when the coil 62' is energized to create a North pole at the armature pole 14d which attracts a field pole 22d. A rotor arm 28d bears against a stop member 30d. FIG. 20 shows the rotor 19D rotated right clockwise when the coil 60 is energized. This creates a North pole at the armature pole 12d to attract the field pole 19d which is stopped by the rotor arm 28d bearing against the stop member 32d.

When power is cut off from either of the coils 60' and 62' and the holding coil 66, the rotor 19d returns automatically to the mid-position illustrated in FIG. 19. The torque diagram of FIG. 17 applies in the same manner as described above for the actuator 10C.

FIGS. 22, 23 and 24 show an actuator assembly 10E arranged for three-position latching. The rotor 19E may be driven to any one of three positions and will remain there until some motive means causes it to move to another position. The rotor arm 28e is located between a pair of field coils 20e and 22e which are symmetrically disposed on a rotor housing of a rotor 19e. A stop member 30e is located to the left and more than 90° from an upright position of the rotor arm 28e and a stop member 32e is located to the right and more than 90° from the upright position of the rotor arm 28e. A pair of armature poles 12e and 14e are disposed 90° apart and carry a respective coil which may be energized by a circuit such as shown in FIG. 16, and hereinbefore described.

By driving the rotor 19E beyond 90° from its midposition in FIG. 22, the rotor housing becomes latched to one of the hard stops 30e, or 32e, that is if the rotor 19e is driven counterclockwise the rotor arm 28 bears against the stop member 30e as shown in FIG. 23 and if the rotor 19E is driven clockwise the rotor arm 28 bears against the stop member 32e as shown in FIG. 24. This latching occurs because the rotor 19E is seeking the opposite minimum reluctance point from the midposition of FIG. 22. The motive force for driving the rotor 19E may be obtained by first electrically making the armature pole 14e a north pole and after the rotor 19e has rotated approximately 75° the armature pole 14e is deenergized and the armature pole 12E is energized, which will cause the rotor 19 to rotate to the position illustrated in FIG. 24 where it is latched when the current is removed. If the armature pole 12e is made a south pole, the rotor 19E will rotate to the left position as shown in FIG. 23. The stop members 30e and 32e are set for a desired rotation. Rotation which is beyond 90° on each side of the midposition illustrated in FIG. 22 so that the stops serve as latching points. The rotor 19e tends to seek minimum reluctance and stability at a point 180° from the midposition of FIG. 22 but it is stopped by one of the hard stops.

FIG. 25 shows the torque diagram for the actuator 10E. It shows that a magnetic counterclockwise (CCW) torque exists when the rotor 19e is driven to the right more than 90° from the 0° midposition. Thus the stop member 32e can retain the rotor 19e in a latched position at 135° for example, or at any rotor position between +90° and 180°. Similarly, the diagram shows that a magnetic clockwise torque exists when the rotor 19e is driven to the left clockwise (CW) beyond −90°. The stop member 30e retains the rotor 19e in a latched position at 135° for example, or at any rotor position between −90° and 180°.

FIGS. 26A through 26E show different armature configurations which may be used for various latching and fail-safe modes of operation. A pair of armature poles 12f, 14f each carrying a full size shoe 90 may be used in axially aligned positions 180° apart as shown in FIG. 26A. A pair of armature poles 12g and 14g may be disposed at an angle less than 180° and more than 90° as shown in FIG. 26B. In FIG. 26C a pair of armature poles 12h and 14h are 120° apart and each have a half size shoe 92. In FIG. 26D three armature poles 12j, 14j and 15j are arranged as shown in FIGS. 18, 19 and 20 but all carry full size shoes 93. In this arrangement some bias means must be provided to latch the rotor at the end positions. In FIG. 26E four armature poles 12k, 14k, 15k, 17k are each provided with a half size shoe 94, 96. That is the shoes 94 extend toward each other on the poles 12k, 14k and the shoes 96 extend toward each other on the poles 15k, 17k. The poles 12k and 14k are less than 90° apart. Similarly, the poles 15k and 17k are less than 90° apart. All of the configurations of FIGS. 26A–26E will have an associated rotor which will inherent restoring torque for fail-safe operation as explained above, in which the rotor tends to assume a position of minimum magnetic reluctance with respect to the field armature. The associated rotor may be subjected to restoring torque for latching operation in a plurality of positions. For example the rotors associated with the armature of FIGS. 26D and 26E may have three positions with the fail-safe in the midposition, similar to the arrangement described in connection with FIGS. 18–20. The rotor associated with the armature having four poles shown in FIG. 26E may have several positions of instability with inherent restoring torque driving the rotor housing to a position of stability.

Figure 27A:
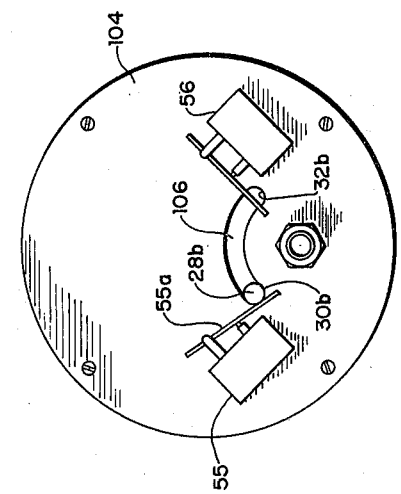
FIGS. 27A, 27B and 27C illustrate a preferable position of the switches of FIG. 12 on the actuator assembly 12B of FIG. 9.
Figure 27B:
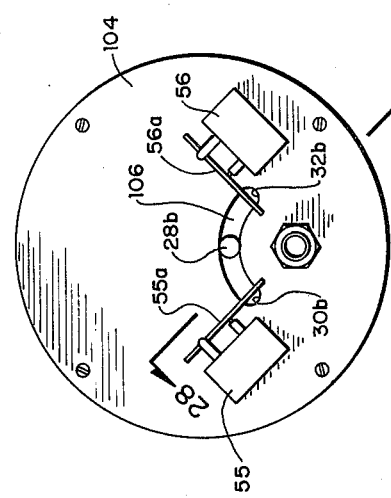
Figure 27C:
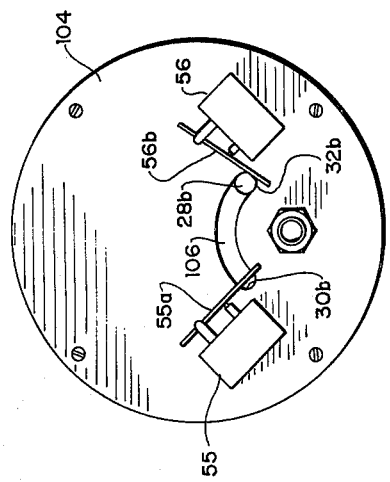
Figure 28:
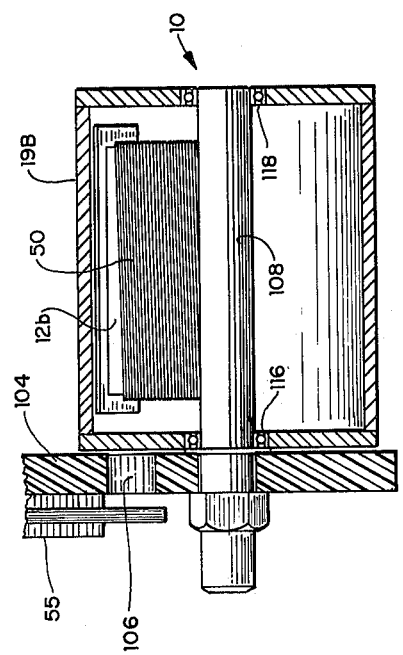
FIG. 28 is a cross sectional view of the actuator assembly 10B along line 28—28 of FIG. 27B.
Figure 29:
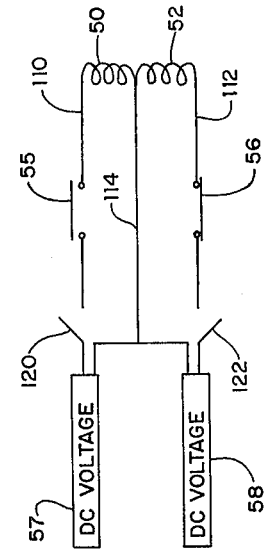
FIG. 29 is an energizing circuit for the actuator assembly 10B illustrated in FIG. 28.

It is sometimes advantageous to have the normally closed switch 55 and 56 illustrated in FIG. 12 deactivated when the arm 28b is stopped by one of the stop members 30b or 32b to thereby remove power from the respective rotor drive coil 50 or 52. Thus as illustrated in FIG. 28, the rotor 19b is surmounted by a plate 104 having a slot 106 with the ends thereof acting as the stop members 30b and 32b respectively (FIGS. 27A, 27B and 27C). The plate 104 is secured to a stationary hollow shaft 108 for passing therethrough, three leads 110, 112 and 114 which energize the drive coils 50, 52 (FIG. 29). A pair of spaced bearings 116 and 118, may be fastened to the shaft 108 for permitting the rotor 19b to rotate freely thereabout upon energization of the respective drive coil 50 or 52.

As illustrated in FIG. 27A, the switch 55 may be a microswitch and is open by virtue of the arm 28b bearing against a pole 55a of the switch 55. When a switch 122 (FIG. 29) is closed, a voltage is applied to the drive coil 52 to create a south pole at the pole 14b (FIG. 9) to rotate the rotor 19b to the position illustrated in FIG. 11 where the arm 28b is stopped by the stop member 32b and to open the switch 56 by bearing against a pole 56b of the switch 56. Thereafter, the switch 122 is opened.

Similarly, when the switch 120 is closed and the arm 28b is in the position illustrated in FIG. 27C, where the switch 55 is closed, and the switch 56 is open, the drive coil 50 is energized such that the armature pole 12b becomes a south pole, to cause the rotor 19b to rotate from the position illustrated in FIG. 11 to that of FIG. 9, where the arm 28B is stopped by the stop member 30b and bears against the pole 55a of the switch 55 to remove the voltage 56 from the drive coil 50. Thereafter, the switch 120 is opened.

It should be understood that the foregoing relates to only a limited number of preferred embodiments of the invention, which have been by way of example only and that it is intended to cover all changes and modifications of the examples of the invention herein chosen for the purposes of the disclosure, which do not constitute departures from the spirit and scope of the invention.

The invention claimed is:

1. A rotary actuator comprising:
   a stationary armature having a plurality of magnetic arms defining fixed poles angularly disposed with respect to each other;
   a cylindrical rotor having a first and second cylindrically curved permanently magnetized field pole of opposite polarity circumferentially spaced apart and surrounding said armature;
   a mechanical stop means for limiting the angular rotation of said rotor, said mechanical stop means comprising:
   a first and second stop member fixed in position with respect to said rotor and spaced apart angularly; and
   an arm means projecting from said rotor and arranged to contact said stop members and thereby end angular rotation of said rotor; and
   a motive means connected to said armature for applying torque to said rotor thereby angularly rotating same whereby the application of torque to said rotor cause rotation of said rotor so that said arm means rotates from said first stop member through an angle whereby said first rotor field pole remains latched to one of said armature magnetic arms and when the torque is removed from said rotor, said rotor rotates toward said first stop member until said arm means contacts said first stop member and when the application of torque to said rotor is such that said rotor rotates through an angle whereby said first rotor field pole is latched to a second of said armature poles and when torque from said motive means is removed from said rotor said arm means will contact said second stop member.

2. A rotary actuator as defined in claim 1, wherein said means for applying torque to said rotor comprises at least one electrically conductive coil wound on at least one fixed pole of said armature for generating a magnetic field when said coil is electrically energized by an applied voltage.

3. A rotary actuator as defined in claim 2, further comprising circuit means connected to said coil for passing an electric current therethrough to generate said magnetic field.

4. A rotary actuator as defined in claim 1, wherein said field poles are circumferentially asymmetrically disposed with two adjacent ends of said field poles more closely spaced together than are the other ends of said field poles to increase the flux density at the more closely spaced ends of said field poles.

5. A rotary actuator as defined in claim 4, further comprising another coil wound on a fixed pole of said armature and arranged to serve as a holding means for holding said rotor stationary in a predetermined position of said rotor when said other coil is energized.

6. A rotary actuator as defined in claim 1, wherein said fixed poles of said armature are more than two in number.

7. A rotary actuator as defined in claim 6, wherein said means for applying torque to said rotor comprises electrically conductive coils wound on certain ones of said fixed poles of said armature for generating magnetic fields when said coils are energized by an applied voltage.

8. A rotary actuator as defined in claim 7, further comprising a circuit means connected to said coils for passing electric currents therethrough to generate said magnetic fields.

9. A rotary actuator as defined in claim 3, wherein said field poles are circumferentially asymmetrically disposed with two adjacent ends of said field poles more closely spaced together than are the other ends of said field poles to increase the flux density at the more closely spaced ends of said field poles.

10. A rotary actuator as defined in claim 3, wherein said fixed poles of said armature are more than two in number.

11. A rotary actuator as defined in claim 3, further including switch means located in the path of travel of said arm means and adapted to be contacted thereby to terminate generation of said magnetic field.

* * * * *